US011628905B2

(12) United States Patent
McCormick et al.

(10) Patent No.: US 11,628,905 B2
(45) Date of Patent: Apr. 18, 2023

(54) BUSHING BYPASS

(71) Applicant: Fox Factory, Inc., Duluth, GA (US)

(72) Inventors: Daniel McCormick, Santa Cruz, CA (US); Joshua Coaplen, Asheville, NC (US)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 17/873,017

(22) Filed: Jul. 25, 2022

(65) Prior Publication Data

US 2022/0355893 A1 Nov. 10, 2022

Related U.S. Application Data

(62) Division of application No. 16/659,148, filed on Oct. 21, 2019, now Pat. No. 11,396,344.

(60) Provisional application No. 62/751,420, filed on Oct. 26, 2018.

(51) Int. Cl.
*F16C 33/10* (2006.01)
*B62K 25/08* (2006.01)
*F16F 9/43* (2006.01)

(52) U.S. Cl.
CPC .............. *B62K 25/08* (2013.01); *F16F 9/43* (2013.01)

(58) Field of Classification Search
CPC ......... B62K 25/08; B62K 25/06; F16C 33/04; F16C 33/10; F16C 33/101; F16C 33/1065; F16C 33/1085; F16F 9/43; F16F 9/366; F16F 9/346; F16F 13/14
See application file for complete search history.

(56) References Cited

U.S. PATENT DOCUMENTS

| | | | |
|---|---|---|---|
| 4,166,522 A | 9/1979 | De | |
| 4,405,119 A | 9/1983 | Masclet et al. | |
| 4,433,759 A | 2/1984 | Ichinose | |
| 5,248,159 A | 9/1993 | Moore | |
| 5,692,756 A | 12/1997 | Altieri | |
| 5,794,942 A | 8/1998 | Vance et al. | |
| 6,991,377 B2 * | 1/2006 | Yamamoto | F16C 17/02 384/291 |
| 7,048,291 B2 * | 5/2006 | Wada | B62K 25/08 280/276 |
| 7,328,742 B2 | 2/2008 | Slack | |
| 8,104,966 B2 * | 1/2012 | Yamamoto | F16C 33/1065 384/292 |
| 8,342,554 B2 | 1/2013 | Felsl et al. | |
| 8,672,096 B2 | 3/2014 | Galasso et al. | |
| 9,739,331 B2 | 8/2017 | William | |
| 10,086,645 B2 | 10/2018 | Liu et al. | |
| 10,724,575 B2 * | 7/2020 | Coombe | F16C 23/045 |
| 2004/0057643 A1 * | 3/2004 | Blanchard | F16C 11/045 384/276 |

(Continued)

FOREIGN PATENT DOCUMENTS

WO 2018100067 A1 6/2018

*Primary Examiner* — Thomas W Irvin

(57) ABSTRACT

A bushing bypass. The bushing bypass includes a bushing having a top surface and a bottom surface. The bushing also includes an inner diameter surface extending between the top surface and the bottom surface. The bushing also includes an outer diameter surface extending between the top surface and the bottom surface. The bushing further includes a channel formed in the outer diameter surface. The channel extends from the top surface of the bushing to the bottom surface of the bushing.

5 Claims, 7 Drawing Sheets

(56) References Cited

U.S. PATENT DOCUMENTS

| | | | |
|---|---|---|---|
| 2005/0074189 A1* | 4/2005 | Wada | B62K 25/08 |
| | | | 384/7 |
| 2009/0268996 A1* | 10/2009 | Yamamoto | F16C 17/02 |
| | | | 384/291 |
| 2011/0042915 A1 | 2/2011 | Felsl et al. | |
| 2011/0268378 A1* | 11/2011 | Modtland | F16C 17/02 |
| | | | 384/292 |
| 2018/0154686 A1 | 6/2018 | Liu et al. | |
| 2018/0363704 A1* | 12/2018 | Coombe | F16C 23/045 |
| 2019/0389536 A1 | 12/2019 | Nuti et al. | |
| 2021/0039740 A1 | 2/2021 | Fellner | |

* cited by examiner

BUSHING BYPASS

CROSS-REFERENCE TO RELATED APPLICATIONS

This application is a Divisional and claims the benefit of and claims priority to the U.S. patent application Ser. No. 16/659,148 filed on Oct. 21, 2019, entitled "BUSHING BYPASS" by Daniel McCormick et al., assigned to the assignee of the present application, and is hereby incorporated by reference in its entirety.

The application Ser. No. 16/659,148 claims the benefit of and claims priority to the U.S. Provisional Patent Application No. 62/751,420 filed on Oct. 26, 2018, entitled "BUSHING BYPASS" by Daniel McCormick et al., assigned to the assignee of the present application, and is hereby incorporated by reference in its entirety.

FIELD OF THE INVENTION

Embodiments of the present technology relate generally to bushing and/or a fork leg in which the bushing is disposed.

BACKGROUND

In some fork assemblies such as, for example, bicycle or motorcycle fork assemblies, an upper fork leg is telescopically engaged with a lower fork leg. Conventionally, one or more bushings are used to provide a slidable interface between the first fork leg and the second fork leg. The bushings are disposed within one of the fork legs such that the outer edge of each of the bushings abuts the inner diameter of the first fork leg, and the inner diameter of each of the bushings abuts the outer diameter of the second fork leg.

Because the bushings occupy the annular region between the first and the second fork legs, the bushings restrict the flow of gas or fluids past the bushings. This bushing-induced restriction will often generate a pressure differential between one side or the other side of a bushing. Such a pressure differential is depicted in Prior Art FIG. 1. It will be understood that such a pressure differential is typically not desired, and that such a pressure differential is likely to be generated during motion of the first leg with respect to the second leg.

BRIEF DESCRIPTION OF THE DRAWINGS

Aspects of the present invention are illustrated by way of example, and not by way of limitation, in the accompanying drawings, wherein.

Prior Art

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

As stated above, in some fork assemblies such as, for example, bicycle or motorcycle fork assemblies, an upper fork leg is telescopically engaged with a lower fork leg. For purposes of brevity and clarity, the following discussion will refer to a first fork leg and a second fork leg to avoid unnecessarily limiting use of the present embodiments to one or other of the upper fork leg and the lower fork leg. Moreover, embodiments of the present invention are well suited for use in an upper fork leg, a lower fork leg, or concurrently in both of the upper fork leg and the lower fork leg. Furthermore, embodiments of the present invention are also used in structures other than fork legs (such as, but not limited to, struts, seat posts, etc.) in which the use of a bushing is required or desired. That said, for purposes of brevity and clarity, and not to be interpreted as a limitation, the following discussion will refer to embodiments of the invention pertaining to a fork leg.

Additionally, in the present application, for purposes of brevity and clarity, the following discussion will refer to a "bushing". It should be noted that the term "bushing", as used herein, is intended to refer to an element (sometimes referred to in the art as a "bushing" and sometimes referred to in the art as a "bearing", or some other term) which provides an interface between moving parts, such as, but not limited to, a first fork leg and a second fork leg.

Additionally, embodiments of the present invention are used in a fork leg with a single bushing, and embodiments of the present invention are also used in a fork leg with two or more bushings. Discussions herein pertaining to an embodiment with a single bushing may also pertain to embodiments with two or more bushings.

Figure 1:
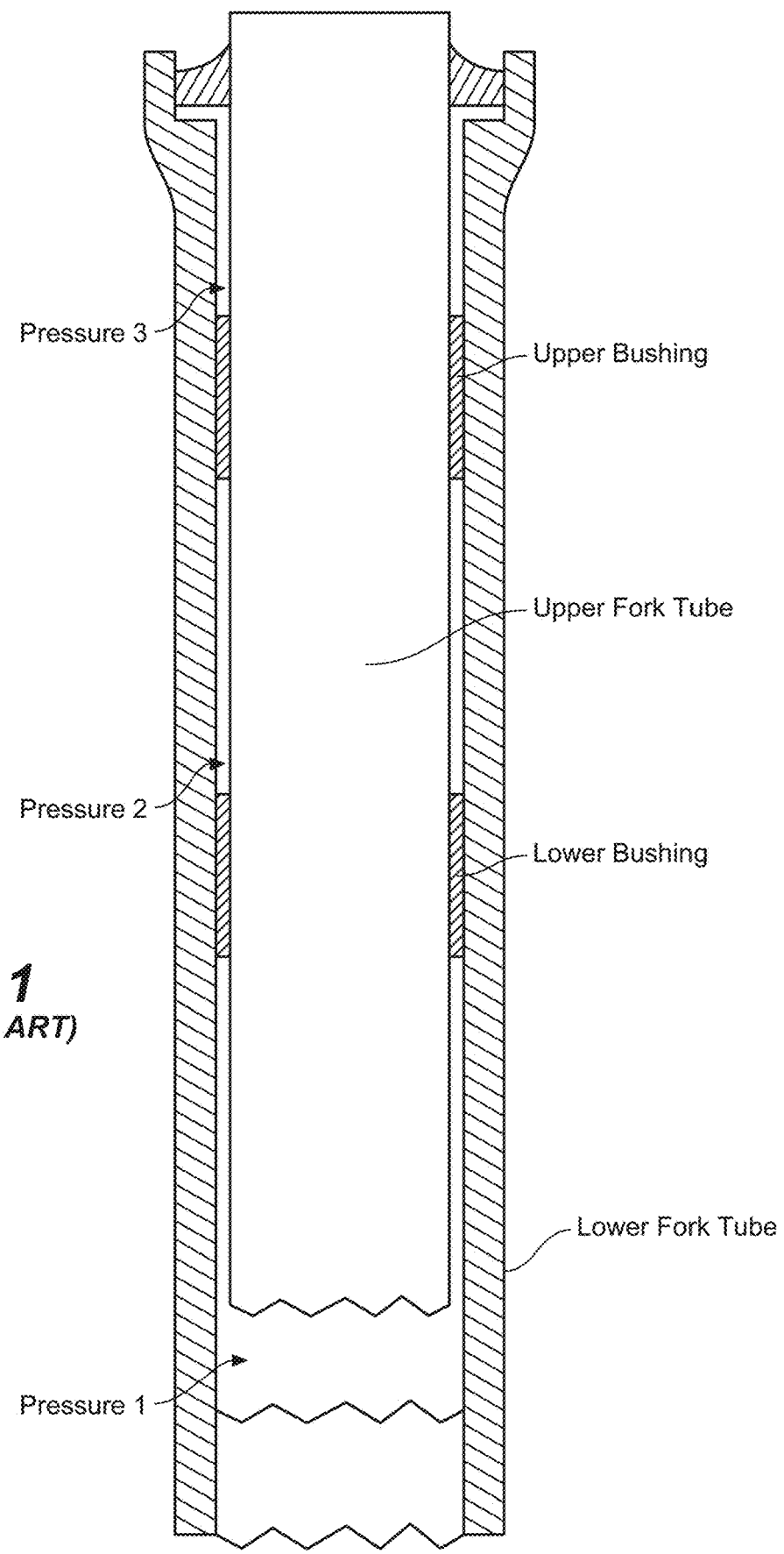
FIG. 1 is a cut-away view of a conventional fork assembly in which the use of conventional bushings generates a pressure differential between the conventional bushings
Figure 2:
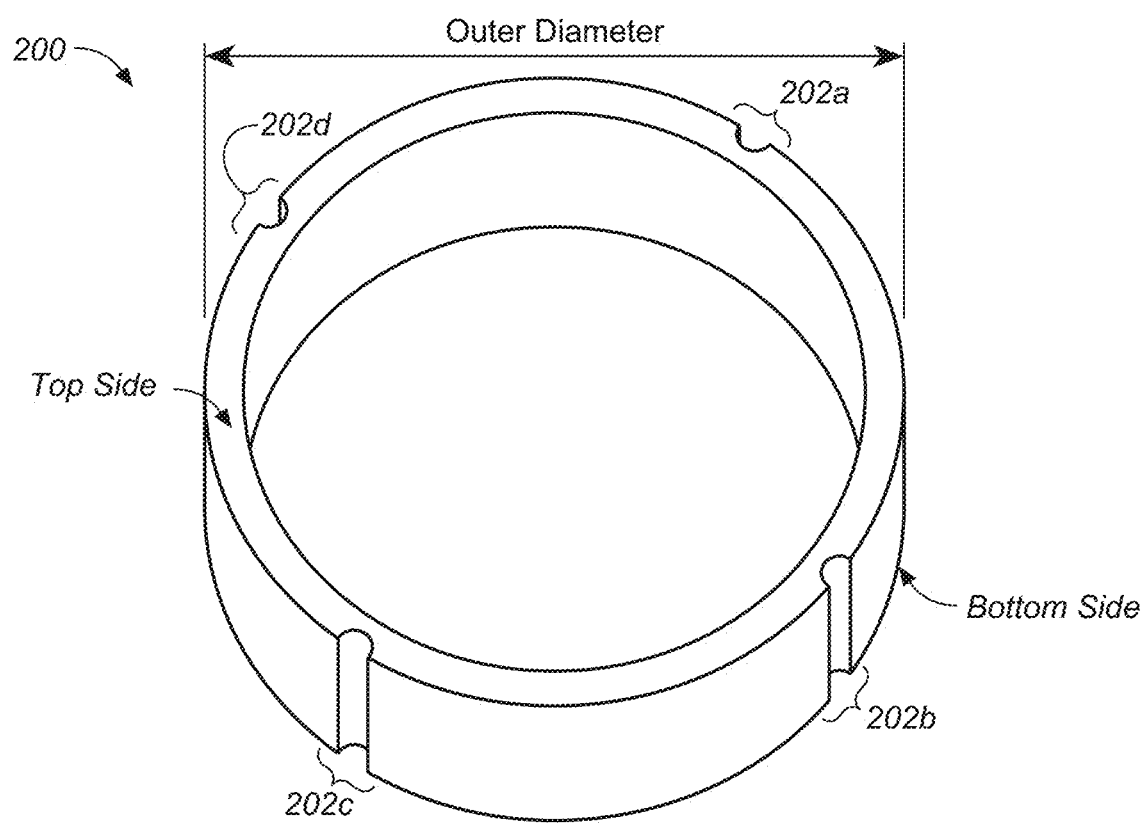
FIG. 2 is a perspective view of a bushing, in accordance with an embodiment of the present invention.

As will be described in detail below, embodiments of the present invention provide a bushing bypass. Referring now to FIG. 2, a perspective view of a bushing 200 in accordance with one embodiment of the present invention is shown. As shown in FIG. 2, in one embodiment, a bushing 200 has a plurality of channels, typically shown as, 202a, 202b, 202c and 202d formed into the outer diameter of bushing 200. Although four channels 202a, 202b, 202c and 202d are shown in the embodiment of FIG. 2, bushing 200 is also well suited to an embodiment in which bushing 200 has a single channel, and to embodiments in which bushing 200 has more than a single channel. As shown in FIG. 2, in bushing 200, channels 202a, 202b, 202c and 202d extend, along the outer diameter of bushing 200, from one side (e.g., the top side) of bushing 200 to the other side (e.g., the bottom side) of bushing 200. In such an embodiment, channels 202a, 202b, 202c and 202d are formed into the outer diameter of bushing 200 and have a sufficient depth and shape to allow gases or fluids to flow through the channel and, as a result, around the outer diameter of bushing 200 and between the inner diameter of a fork leg housing, when bushing 200 is disposed within the fork leg housing.

Referring still to FIG. 2, although only a single bushing 200 is shown for purposes of brevity and clarity, in various embodiments, at least one channel is formed into the outer diameter of two (or more) bushings in a single fork assembly (or within a single fork leg) to reduce gas or fluid restriction at the location of each of the two (or more) bushings.

Figure 3:
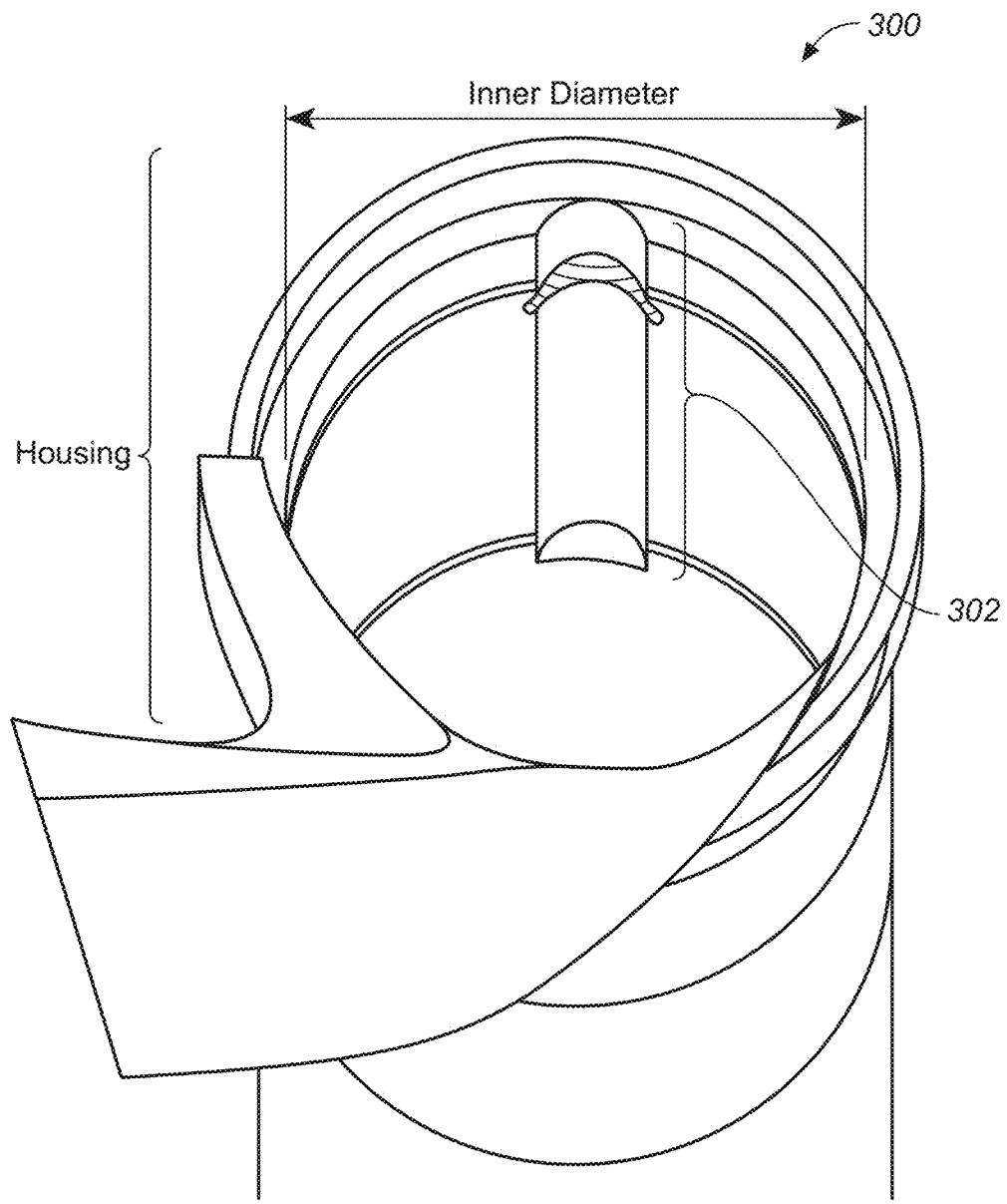
FIG. 3 is a perspective view of a fork leg, in accordance with an embodiment of the present invention.

Referring now to FIG. 3, a perspective view of a fork leg 300 in accordance with one embodiment of the present invention is shown. As shown in FIG. 3, in another embodiment, the present invention is comprised of a channel 302 formed into the inner diameter of the housing of fork leg 300. Moreover, in such an embodiment, channel 302 is formed into the inner diameter of the housing at a location where a bushing (such as, but not limited to, for example, bushing 200 of FIG. 2) will reside.

Additionally, in the embodiment of FIG. 3, channel 302 is formed into the inner diameter of the housing and has a length such that channel 302 will extend, at least, from one side of a bushing to the other side of the bushing (when the bushing is located in the housing). Again, in such an embodiment, fork leg 300 will have one or more channels formed into the inner diameter of the housing of fork leg 300 (FIG. 3 shows an embodiment having only a single channel 302 for brevity and clarity and not as a limitation). In such an embodiment, channel 302 is formed into the inner diameter of the housing of fork leg 300 and has a sufficient depth and shape to allow gases or fluids to flow through the channel and, as a result, around the outer diameter of a bushing when a bushing is disposed within the fork leg housing.

Referring still to FIG. 3, although channel 302 is shown at the location where a single bushing will reside, for purposes of brevity and clarity, in various embodiments, an additional channel (or channels) is formed into the inner diameter of the housing at other locations where other bushings will reside. Furthermore, embodiments of the present invention are well suited to use within a single fork assembly (or within a single fork leg) to reduce gas or fluid restriction at the location of each of the two (or more) bushings.

Referring still to the embodiment of FIG. 3, in another embodiment a single channel 302 is formed into the inner diameter of the housing with single channel 302 having a length sufficient to extend past each of the locations where two (or more) bushings are disposed within fork leg 300.

Figure 4:
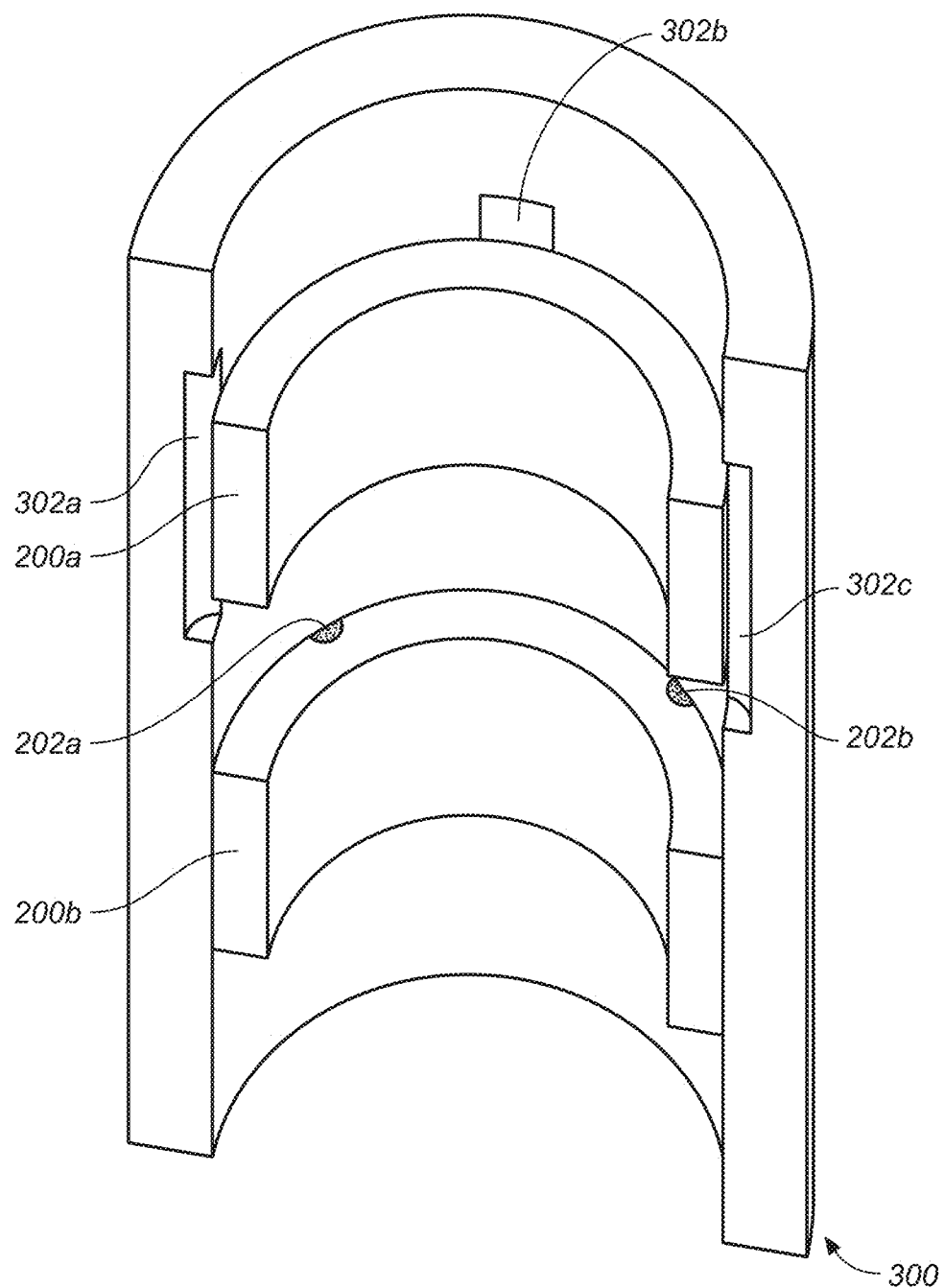
FIG. 4 shows an embodiment having channels formed into the outer diameter of a first bushing and channels are formed into the inner diameter of the housing at the location where a second bushing is disposed to reduce gas or fluid restriction at the location of first bushing and second bushing, in accordance with an embodiment of the present invention.

Referring now to FIG. 4, in another embodiment, channels 202a and 202b are formed into the outer diameter of a first bushing 200a, and channels 302a, 302b and 302c are formed into the inner diameter of the housing at the location where a second bushing 202b is disposed to reduce gas or fluid restriction at the location of first bushing 200a and second bushing 200b.

Figure 5:
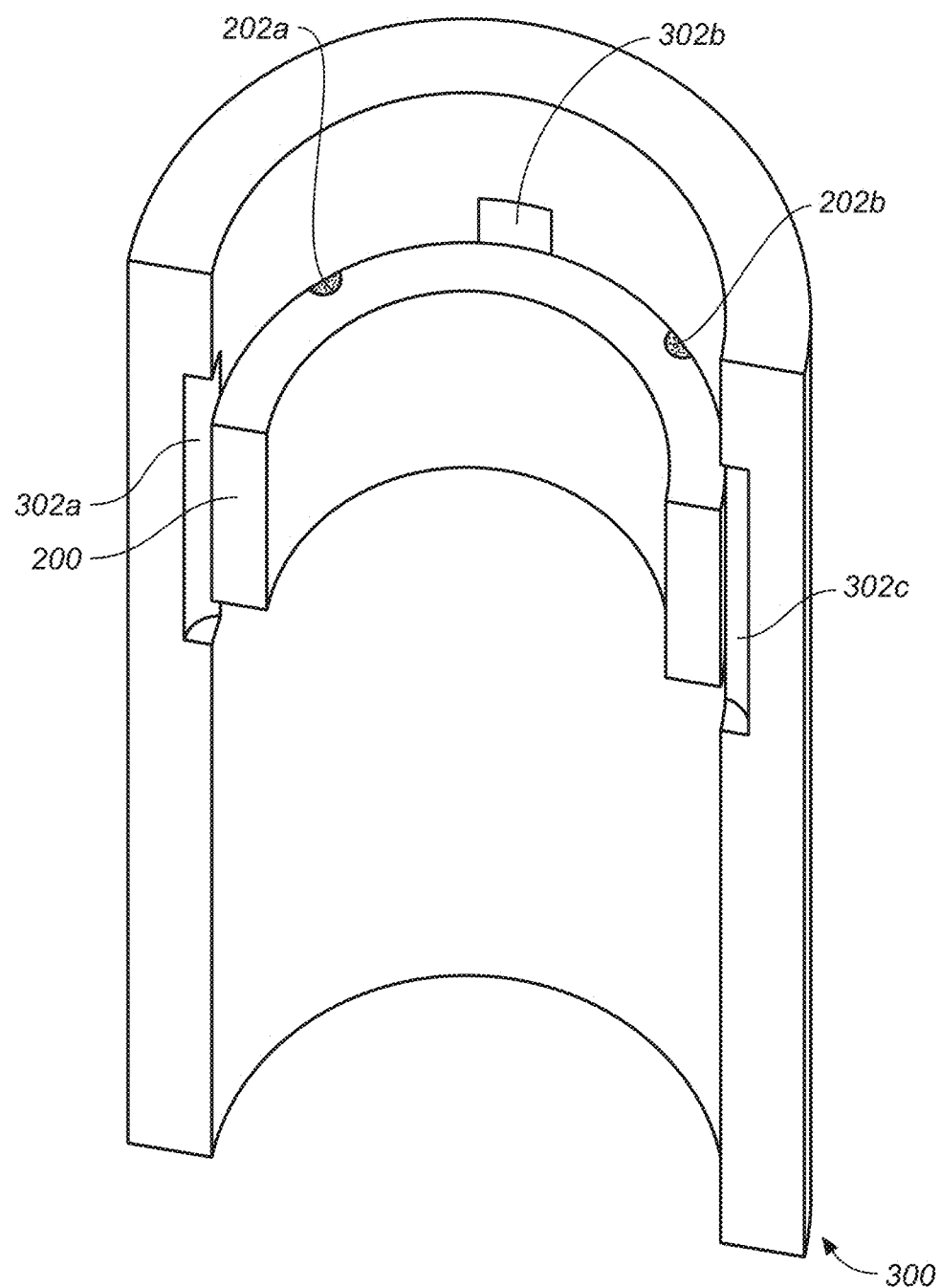
FIG. 5 depicts an embodiment in which outer diameter channels of the bushing and the inner diameter channels of the housing are offset with respect to each other, in accordance with an embodiment of the present invention.

Referring now to FIG. 5, in another embodiment, one or more channels 202a and 202b are formed into the outer diameter of a bushing 200, and one or more channels 302a, 302b and 302c are formed into the inner diameter of the housing at the location where bushing 200 is disposed. In such an embodiment, the outer diameter channels 202a and 202b on bushing 200 and the inner diameter channels 302a, 302b and 302c on the housing both reduce gas or fluid restriction at the location of the bushing. In the embodiment of FIG. 5, the outer diameter channels of the bushing and the inner diameter channels of the housing are offset from each other such that the bushing outer diameter channels and the housing inner diameter channels do not co-form any common channel.

Figure 6:
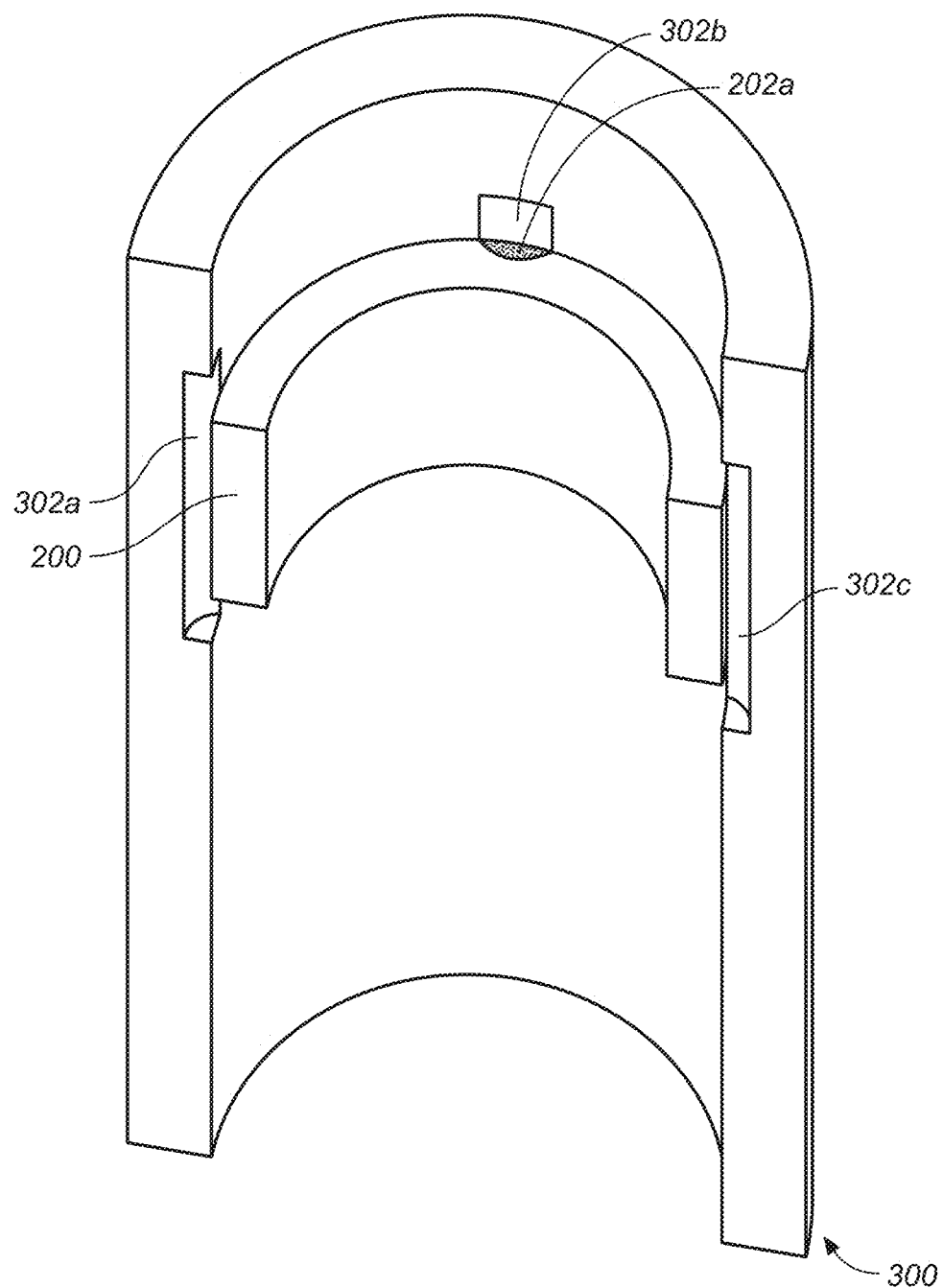
FIG. 6 depicts an embodiment in which outer diameter channels of the bushing and the inner diameter channels of the housing are co-located with each other to at least partially co-form a common channel, in accordance with an embodiment of the present invention.

Referring now to FIG. 6, in the present embodiment, at least one of the outer diameter channels of the bushing and at least one of the inner diameter channels of the housing can be co-located with each other to at least partially co-form a common channel.

Figure 7:
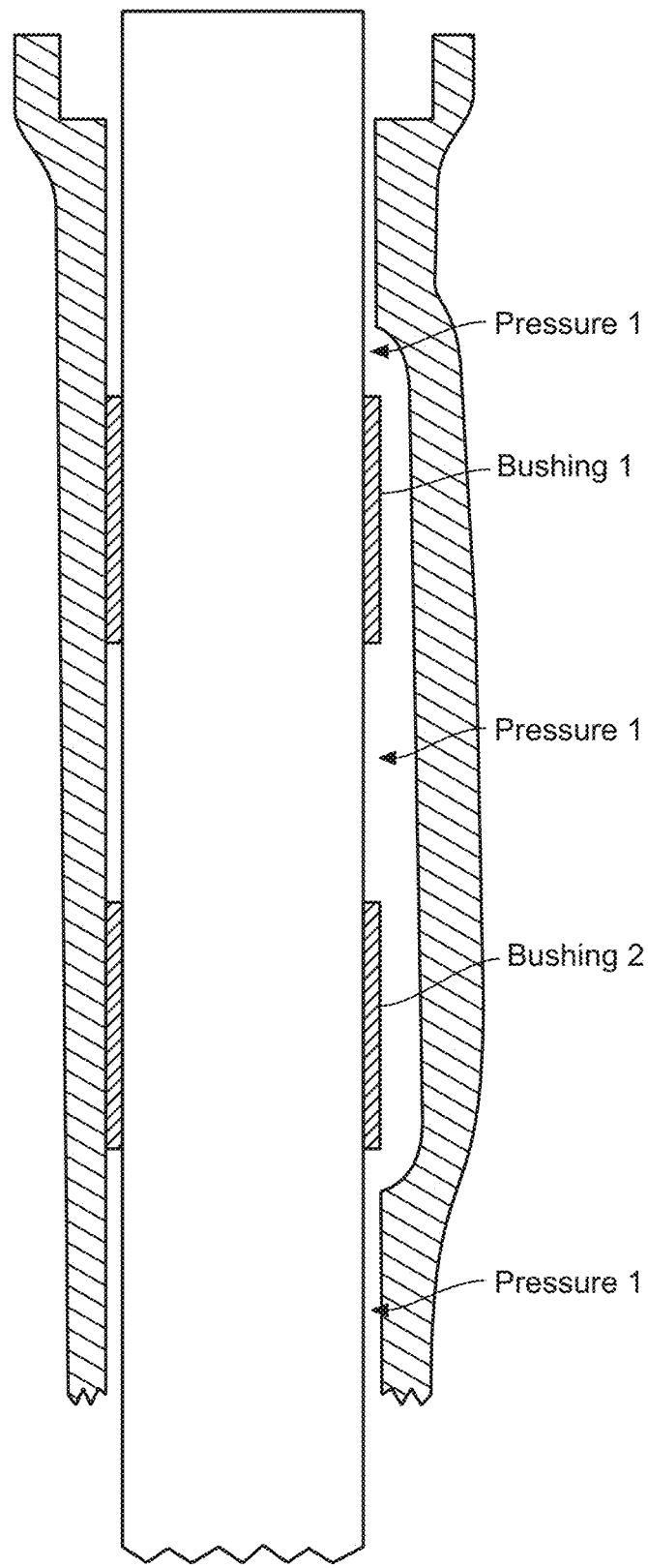
FIG. 7 depicts an embodiment of the present invention reducing or eliminating the unwanted pressure differential between bushings, in accordance with an embodiment of the present invention.

Referring now to FIG. 7, embodiments of the present invention thereby reduce or eliminate the unwanted pressure differential between bushings as is found in conventional fork legs. Notice in FIG. 7, that in embodiments of the present invention, the regions on various sides of bushing 1 and bushing 2 are at the same pressure, pressure 1. Additionally, embodiments of the present invention are able to reduce or eliminate the unwanted pressure differential between bushings without negatively affecting the interface between the inner diameter of a bushing and the outer diameter of a fork leg slideably engaged with the inner diameter of the bushing. Hence, embodiments of the present invention maintain and protect the integrity of the interface between the inner surface of the bushing and the outer diameter the fork leg slideably engaged with the inner diameter of the bushing. It will be understood that FIG. 7, represents embodiments in which channels are formed into the inner diameter of a housing. FIG. 7 also represents embodiments in which channels are formed into the outer diameter of a bushing. FIG. 7 also represents embodiments in which channels are formed into the inner diameter of a housing and channels are formed into the outer diameter of a bushing.

In one embodiment, the present bushing bypass is used in a fork which includes a self-lubricating suspension seal. A detailed description of such a self-lubricating suspension seal is found in U.S. Pat. No. 8,672,096 to Galasso et al., issued Mar. 18, 2014, and entitled "Methods and Apparatus for Lubricating Suspension Components", which is commonly-owned by, and assigned to, the assignee of the present application. The aforementioned U.S. Pat. No. 8,672,096, is herein incorporated by reference, in its entirety, into the present Application. Furthermore, in one embodiment, the present bushing bypass is used in a fork which includes an air bleed assembly. A detailed description of such an air bleed assembly is found in U.S. Pat. No. 9,739,331 to William M. Becker, issued Aug. 22, 2017, and entitled "Method and Apparatus for an Adjustable Damper", which is commonly-owned by, and assigned to, the assignee of the present application. The aforementioned U.S. Pat. No. 9,739,331, is herein incorporated by reference, in its entirety, into the present Application.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A bushing bypass comprising:
 a bushing, said bushing comprising:
  a top surface;
  a bottom surface;
  an inner diameter surface extending between said top surface and said bottom surface;
  an outer diameter surface extending between said top surface and said bottom surface; and
  a channel formed in said outer diameter surface, said channel extending from said top surface to said bottom surface; and
 a housing, said housing comprising:
  an inner diameter surface, said inner diameter surface configured to have said bushing disposed adjacent thereto; and
  a channel formed in said inner diameter surface, said channel having a length sufficient to extend along said outer diameter surface of said bushing at least from said top surface of said bushing to said bottom surface of said bushing.

2. The bushing bypass of claim 1 wherein said channel formed in said inner diameter surface of said housing and said channel formed in said outer diameter surface of said bushing are disposed with respect to each other such that said channel formed in said outer diameter surface of said bushing and said channel formed in said inner diameter surface of said housing at least partially co-form a common channel.

3. The bushing bypass of claim 1 wherein said channel formed in said inner diameter surface of said housing and said second channel formed in said outer diameter surface of said bushing are disposed with respect to each other such that said second channel formed in said outer diameter surface of said bushing and said channel formed in said inner diameter surface of said housing at least partially co-form a common channel.

4. A bushing bypass comprising:
 a housing, said housing comprising:
  an inner diameter surface, said inner diameter surface configured to have a plurality of bushings disposed adjacent thereto in a vertically stacked arrangement; and
  a channel formed in said inner diameter surface, said channel having a length sufficient to extend along an outer diameter surface of said plurality of bushings at least from a top surface of said top-most disposed bushing of said plurality of bushings to a bottom surface of said bottom-most disposed bushing of said plurality of bushings.

5. The bushing bypass of claim 4 further comprising:
 a second channel formed in said inner diameter surface of said housing, said second channel having a length sufficient to extend along an outer diameter surface of said plurality of bushings at least from said top surface of said top-most disposed bushing of said plurality of bushings to said bottom surface of said bottom-most disposed bushing of said plurality of bushings.

\* \* \* \* \*